Dec. 27, 1938.  A. B. JACOBUS ET AL  2,141,246
HEART BEAT INDICATOR SCALE
Filed July 15, 1935  4 Sheets-Sheet 1

ALVAH B. JACOBUS
HARLAN A. HADLEY
INVENTORS

BY
ATTORNEY

Dec. 27, 1938.    A. B. JACOBUS ET AL    2,141,246
HEART BEAT INDICATOR SCALE
Filed July 15, 1935    4 Sheets-Sheet 2

ALVAH B. JACOBUS
HARLAN A. HADLEY
INVENTORS

BY
ATTORNEY

Dec. 27, 1938.    A. B. JACOBUS ET AL    2,141,246
HEART BEAT INDICATOR SCALE
Filed July 15, 1935    4 Sheets-Sheet 3

ALVAH B. JACOBUS
HARLAN A. HADLEY
INVENTORS

BY
ATTORNEY

Dec. 27, 1938.  A. B. JACOBUS ET AL  2,141,246
HEART BEAT INDICATOR SCALE
Filed July 15, 1935   4 Sheets-Sheet 4
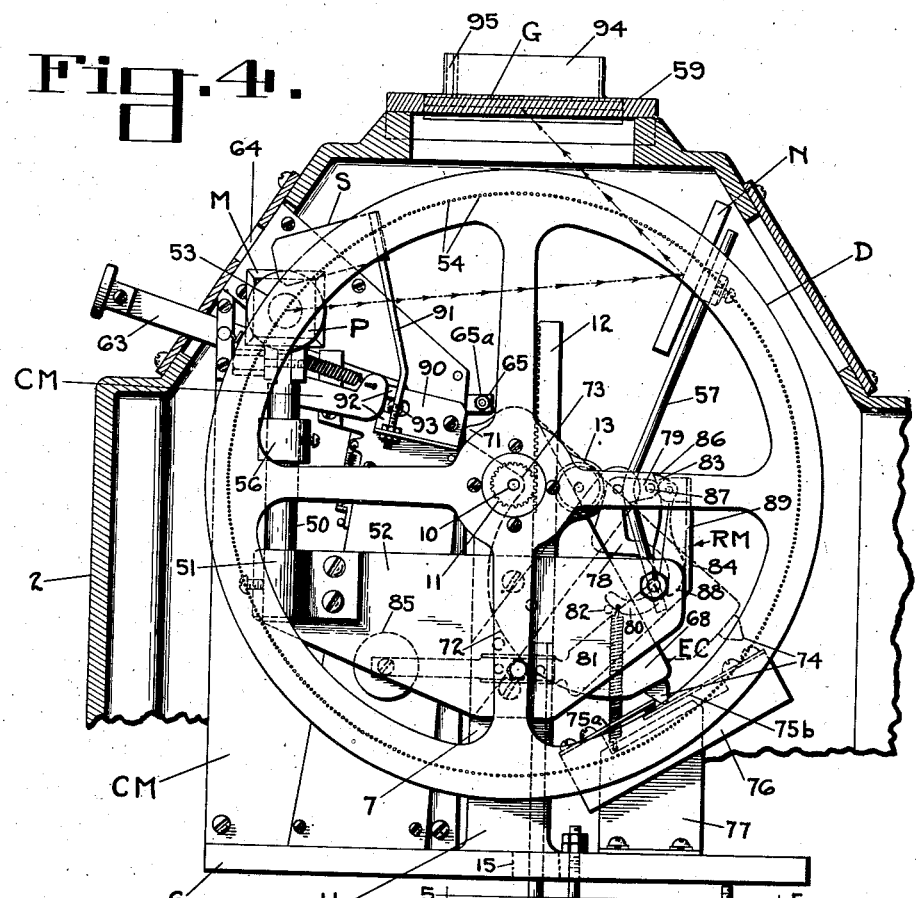
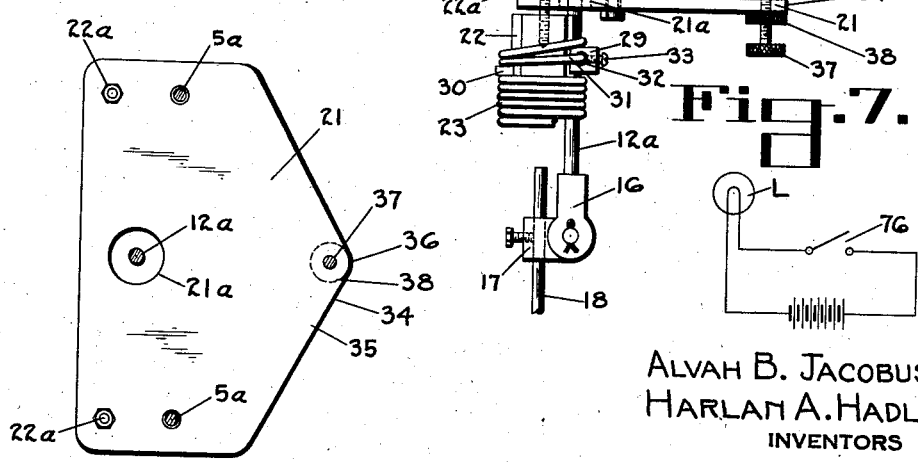
ALVAH B. JACOBUS
HARLAN A. HADLEY
INVENTORS
BY
ATTORNEY Patented Dec. 27, 1938

2,141,246

UNITED STATES PATENT OFFICE 2,141,246

HEART BEAT INDICATOR SCALE

Alvah B. Jacobus and Harlan A. Hadley, St. Johnsbury, Vt., assignors to E. and T. Fairbanks and Company, St. Johnsbury, Vt., a corporation of Vermont Application July 15, 1935, Serial No. 31,404

5 Claims. (Cl. 265—68)

This invention relates to improvements in heart beat indicator scales employing means for visually showing the heart pulsations of a person standing on the scale platform.

One of the important objects of the invention is to provide optical projection means co-operating with perforated directing means carried by the indicator mechanism, whereby a beam of light is directed through the perforations to reflectors disposed in its path, and hence to a ground glass for visible indication.

Another object is to provide a shutter for the light beam controlled by operative mechanism and normally disposed in the path of the light beam until subsequently raised by the operative mechanism to permit the light beam to function.

Another object is to provide means on the ground glass for visually and readily indicating variations in heart pulsations of the operator.

Another object is to provide means for controlling an electrical switch in circuit with the light beam projector and adapted to close the circuit in order to operate the projector.

Still another object is to provide means for locking the electrical switch control while the projector is in operation, together with means for releasing the switch control to open the switch and shut off the projector when the operator steps from the platform.

These and other objects and features of the invention will more fully appear in the following description and will be particularly pointed out in the appended claims.

A preferred embodiment of the invention is illustrated in the accompanying drawings in which,—

Figure 4 is an enlarged rear elevation, partly in section, of the assembly unit, on the line 4—4 of Fig. 3, showing especially the coin controlled operating mechanism, the rotatable perforated light beam disc, the electric circuit control mechanism and the weight indicator balance adjusting mechanism.

Figure 5 is a plan view, on the line 5—5 of Fig. 4, of the weight indicator balance adjusting plate.

Figure 7 is a wiring diagram of the electric circuit.

Figure 1:
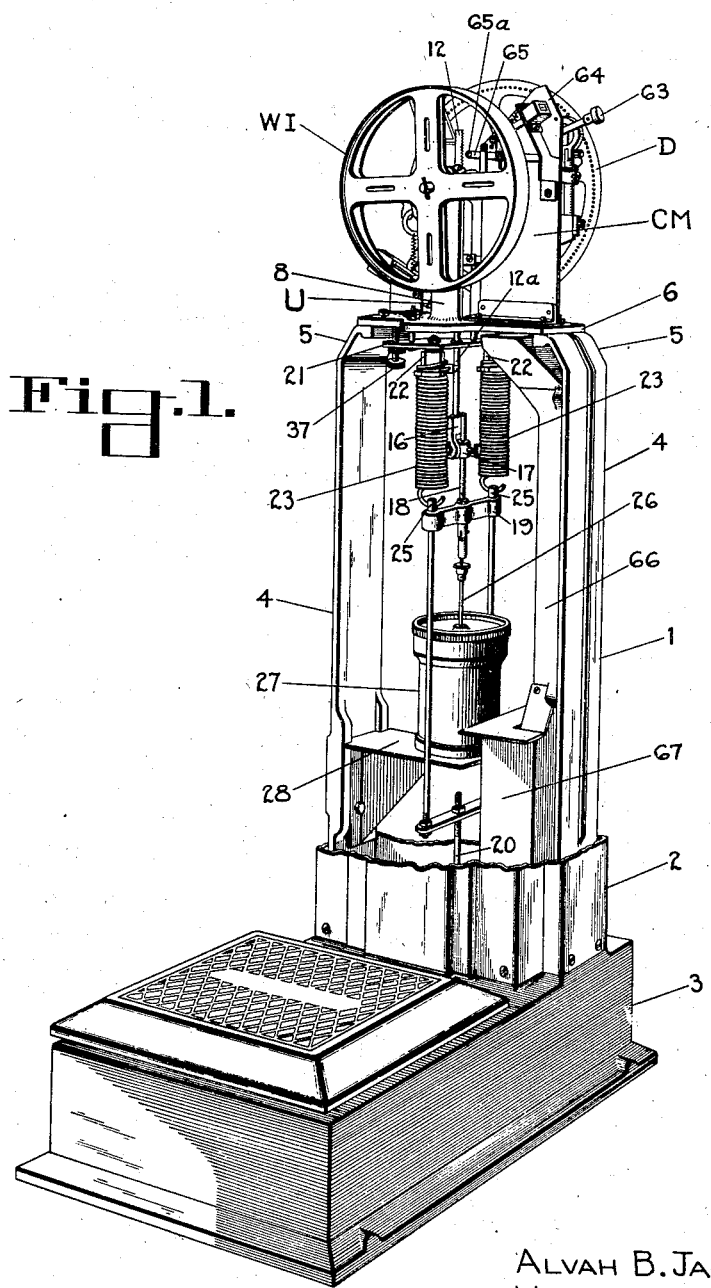
Figure 1 is a perspective view of the apparatus, with the casing partly broken away, and embodying our invention.

Referring to the drawings 1 designates an upright frame, which is enclosed within a casing 2 and is mounted on a suitable base 3. The frame 1 is comprised of two spaced side members 4, which support on their upper ends 5 the base plate 6 of an assembly unit U, which is adapted to carry the various operative parts of the heart beat indicator mechanism.

The assembly unit U consists primarily of two spaced upright standards 7 and 8, having mounted in ball bearing units 9 carried by their upper ends an indicator shaft 10 carrying thereon a pinion 11 (Figure 4), which meshes with a rack pinion 12 held in operative engagement with the pinion 11 by an offset adjustable roller 13 mounted on a lug 14 extending from the standard 7. The rack rod 12a extends downwardly through an opening 15 in the base plate 6 and is connected by a clevis 16 carrying a pivoted connecting block 17 to a rod 18 secured to a rectangular connector frame 19, the lower end of which is attached to the draft rod 20 operatively connected to the load supporting levers (not shown) which are located in the base 3. Below the base plate 6 and movably mounted on spaced bolts 5a attached to the base plate 6 is located an indicator balance adjusting plate 21 (Figs. 4 and 5), provided with an opening 21a through which the rack rod 12a extends and serving as a fulcrum point when the plate 21 is tilted during its adjustment. The plate 21 also serves as a mounting plate, having depending therefrom two spaced holding blocks 22, on which are mounted spaced coiled springs 23. The lower wire ends 24 of the spring coils are hooked in openings in upright posts 25 disposed at the upper end of the connector frame 19, to which is also pivotally connected the rod 26 of a dash pot 27 located within the frame 19 on a shelf 28 attached to one of the frame side members 4.

The spring holding blocks 22 are provided with tension means comprising opposed upper and lower laterally extending lugs 29 and 30 respectively, between which the upper wire ends 31 of the spring coils are passed, their ends being inserted in an opening 32 in the upper lugs 29 in which they are held by set screws 33. By this means the tension of the springs is readily adjusted by turning the wire ends 31 up or down in the spring holding blocks 22.

In order to vary the position of the indicator adjusting plate 21 the outer end 34 of the adjusting plate is provided with a tapered extension 35, in which is mounted at its tip end 36 an adjusting screw 37 provided with a lock nut 38, the upper end of the adjusting screw engaging the base plate 6 and serving to longitudinally tilt the adjusting plate by raising or lowering the tip end 36 thereof as may be required to properly balance the weight indicator at the zero position. Further, by this arrangement the coiled springs 23 and the rack rod 12a with its co-operating connector frame 19 are all adjusted to co-operatively assist in balancing the weight indicator wheel WI in conjunction with the adjustable block supporting screw 22a.

Figure 3:
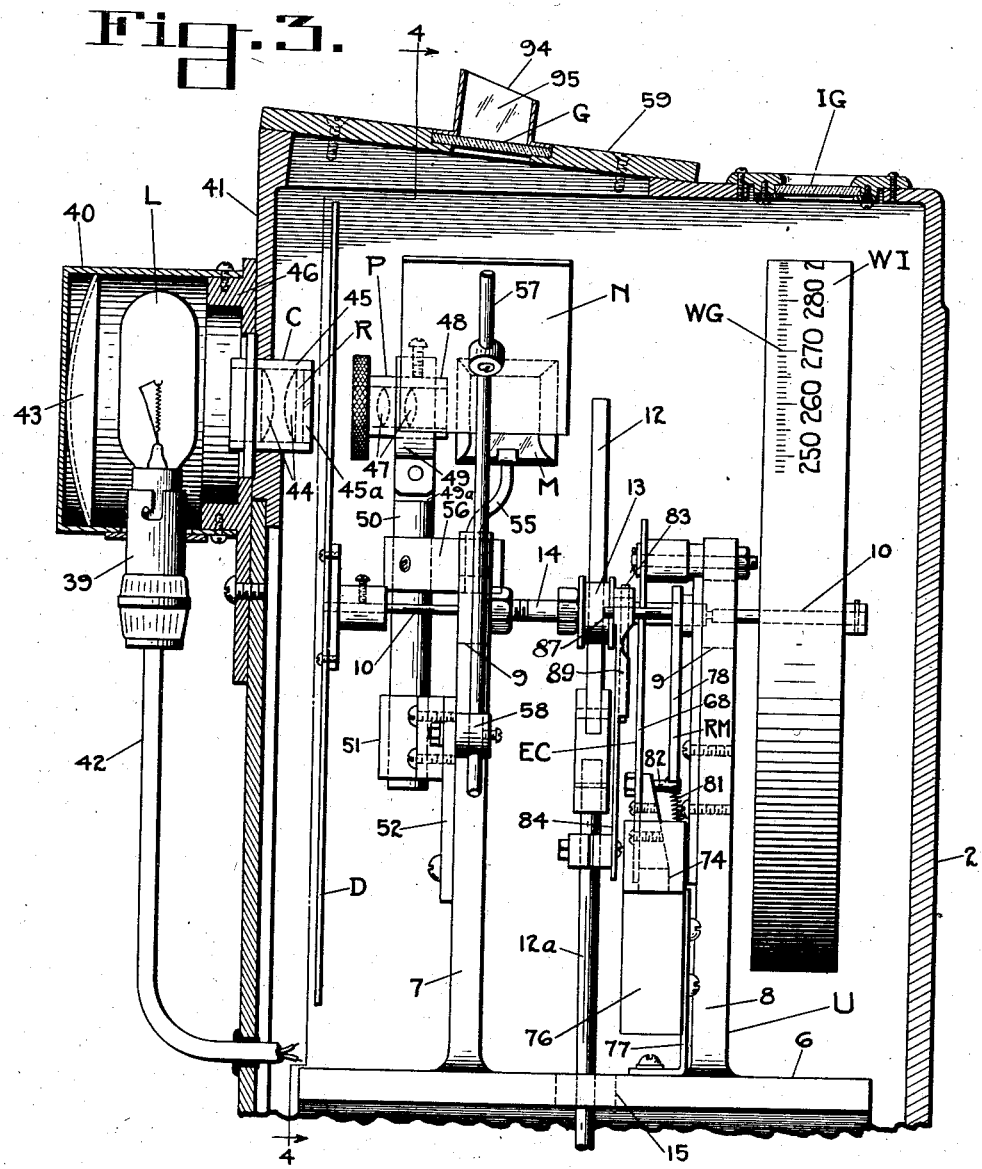
Figure 3 is an enlarged side elevation, partly in section, of the assembly unit showing particularly the cooperating light beam source, the light beam condenser unit, projecting unit, angularly disposed reflecting mirrors, and the ground glass for displaying the projected light beam heart beat indicator dots.

The various elements of the heart beat indicator mechanism are assembled on the assembly unit U and include an illuminating element embodied in an electric lamp L, which is mounted in a lamp socket 39 located in a housing 40 attached to the upper end of the casing back plate 41 (Fig. 3), the lamp being connected by a cable 42 to the electric circuit. Behind the lamp L is positioned a vertical concave reflector 43, by which means the light beam from the lamp is intensified and directed to an optical light condenser unit C for diffusing the light consisting of a pair of spaced plano-convex lenses 44 mounted in a tubular mount 45 secured to the housing attachment plate 46 and extending into the interior of the casing 2. A red glass R for coloring the light beam is inserted in the outer end of the tubular mount 45 and is held in place by a split ring 45a.

Disposed in direct line with the condenser unit C and spaced therefrom is a light beam projector unit P, which is comprised of a pair of spaced double convex lenses 47 mounted in a tube 48 adjustably mounted in an annular holder 49, which is swivelly connected to an extended portion 49a at the upper end of a vertical assembly rod 50 adjustably held in a collar 51, attached to one end of a longitudinal assembly plate 52 carried by the inner standard 7. Secured to the inner end of the indicator shaft 10 is a skeleton disc D (Figs. 3 and 4), which is adapted to rotate therewith and has its peripheral portion 53 positioned between the condenser unit C and the projector unit P.

Figure 2:
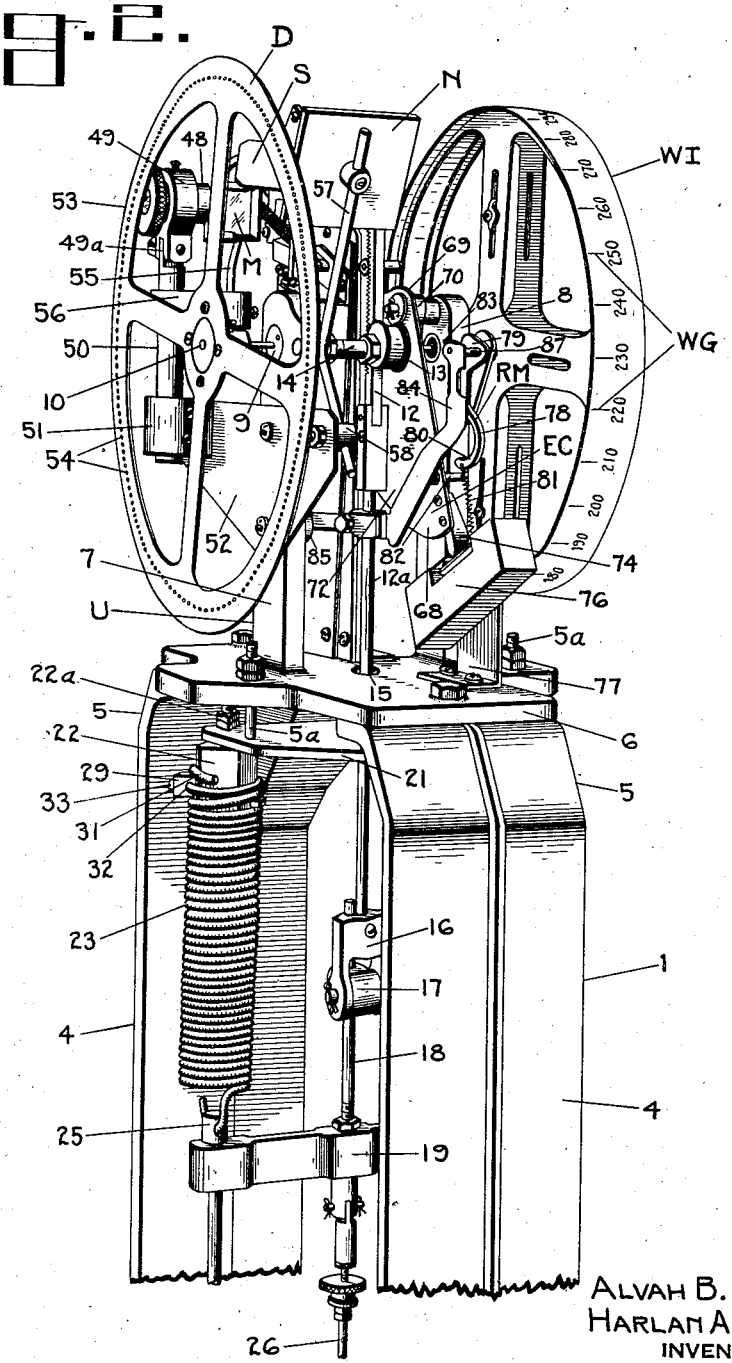
Figure 2 is an enlarged vertical elevation of the upper end of the apparatus as shown in Fig. 1, showing the general arrangement of the rotatable perforated light beam disc for intercepting the light beam, the electric circuit control mechanism and the weight indicator wheel.

While the heart beat indicator may be operated solely as a means for measuring heart pulsations, it may advantageously have associated with it a weight indicator wheel WI, as shown in Fig. 2, which is provided with weight graduations WG and is mounted on the inner end of the indicator shaft 10, its weight graduations being observed by the operator through a translucent glass IG located in the top of the casing 2. Thus a weight indicator is readily combined with the heart beat indicator mechanism under the same operative control and a dual function is thus performed by the indicator shaft 10.

Figure 6:
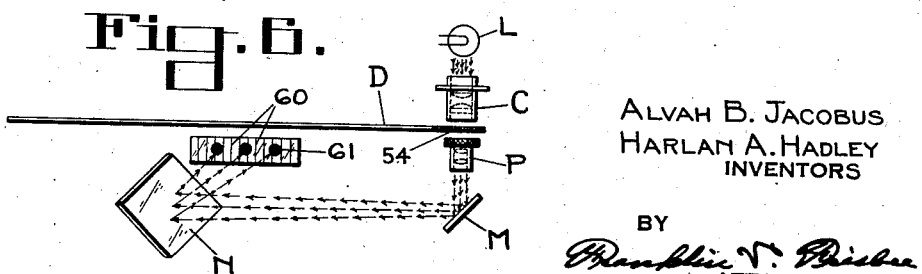
Figure 6 is a diagrammatic view showing the line of travel of the projected light beam from its source to the reflected heart beat indicator dots displayed on the ground glass.

The peripheral portion 53 of the rotatable disc D is provided with a series of equally spaced circular perforations 54, the axes of which coincide respectively with the axes of the condenser lenses 44 and projector lenses 47. Disposed adjacent to the end of the projector unit P and at a vertical angle thereto is located a mirror M in position to receive and reflect the light beam emitted from the projector unit P, the mirror being swivelly mounted on an offset rod 55, which is likewise swivelly mounted in a vertically adjustable arm 56 carried on the assembly rod 50 below the projector unit P. Mounted at the other end of the plate 52 is a mirror N angularly disposed with relation to the mirror M and adjustably carried on an offset rod 57 likewise adjustably secured in a laterally extending stud 58 attached to the assembly plate 52. Located above the projector unit P and the mirrors M and N is the ground glass G (Fig. 3) inserted in a top plate 59 secured to the top of the casing 2 and provided preferably with a series of spaced transverse lines 60 (Fig. 6). In the operation of the device, as is graphically illustrated in Figs. 2 and 4, when the operator has stepped on the platform and the lamp L is lighted as hereinafter described, the perforated disc D under control of the rotated indicator shaft 10 upon reaching its balanced position is caused to slightly oscillate under the influence of the heart pulsations of the operator acting upon the co-operating coiled springs 23, thereby causing the disc D and its perforations 54 to intercept and oscillate accordingly the reflected light beam from the lamp L. The intensity of the oscillations of the disc D and the perforations 54 varies in accordance with the strength of the imparted heart pulsations. Thus the oscillating light beam is directed to the condenser unit C (Fig. 6), where the light beam is condensed and directed to the projector P, whence the light beam is magnified and projected to the mirror M and hence to the angularly disposed mirror N and upward to the ground glass G, where in the form of a red oscillating light beam image or dot 61 the projected light beam oscillates across the transverse lines 60, thereby giving a visible indication of the heart pulsations of the operator as well as measuring clearly their oscillatory amplitude and intensity variations, and enabling their number to be readily counted.

The co-operating control mechanism EC for releasing the heart beat indicator for operation and for controlling the opening and closing of the electric circuit to the electric lamp L is shown in Fig. 4. Thus the mechanism which is employed for releasing the heart beat mechanism for operation is the coin-controlled mechanism CM (Fig. 4), fully described and shown in the copending application of Guldbrand Gulbrandsen. In this mechanism a plunger 63 serves to advance a coin inserted in the coin shute 64 to operate and depress a pivoted actuating bar 65, which carries a roller 65a on its free end, the coin passing down through the coin shute 66 to the coin box 67 rendered accessible by a detachable back plate. Located adjacent to the actuating bar 65 and co-operating with the coin-controlled mechanism CM is the electric circuit control mechanism EC forming part of the heart beat indicator mechanism. Included in the control mechanism is a control member 68, pivotally mounted at its upper end 69 on a lateral lug 70 extending from the outer standard 8. The control member 68 is provided with a round nosed lateral lug 71 adapted to co-operate with the actuating bar 65 and has a lower enlarged weighted portion 72, designed for a purpose hereinafter noted, both of which parts extend inwardly with an intervening recessed portion 73 through which the indicator shaft 10 extends. Inserted in the lower end of the control member 68 is a contactor tip 74 of insulating material, preferably Bakelite, which is adapted to engage and co-operate with the lower leaf 75b of a spring switch 76, which is mounted in an inclined position in a bracket 77 secured to the base plate 5 and in electrical circuit with the electric lamp L of the projecting mechanism. The electric switch 76 is comprised of upper and lower leaf springs 75a and 75b respectively and is normally held open by the contactor tip 74, which depresses and holds down the lower leaf spring 75b, as shown in Fig. 4, the electric current thus being rendered inactive.

Adjacent to the control member 68 is the releasing and locking mechanism RM, which includes a pivotally mounted locking hook 78, which is provided with a rearwardly extending arm 79 and a lower hooked end 80. Secured to the hooked end 80 is a coiled spring 81, which is attached to the switch bracket 77 and is adapted to hold the locking hook 78 resiliently in position and to return the hook after its operation. Near the outer edge of the control member 68 is mounted an inwardly and laterally extending pin 82, which cooperates with the hooked end 80 of the locking hook. A vertically disposed tripping dog 83 for the locking hook 78 is pivotally mounted on the inner upwardly inclined end of an arm 84 carried by the rack rod 12 and has a counterbalance 85 on its outer end. The tripping dog 83 is provided at its upper end with a pointed upwardly inclined tip end 86, which co-operates with a roller 87 mounted on a stud 87a at the end of the locking hook arm 79. The tripping dog 83 normally passes by the roller 87, when the rack rod 12a is freed to move downward under influence of the load, being provided with an enlarged pendulated or weighted end 88 engaged and held in its vertical position by a laterally extending flange 89. Pivotally mounted at the upper end of the coin chute 64 on its inner side and forming part of the heart beat mechanism is a shutter bar 90 carrying a light beam shutter S (Fig. 4) attached to a rod 91 extending upwardly from the bar 90. At the inner end of the shutter bar 90 are spaced fingers 92, between which extends an operating pin 93 carried by the actuating bar 63, adapted to alternately lower and raise the shutter S as it is operated. A shadow box 94 is mounted on the top plate 59 above the ground glass G in order to prevent outside light from reducing the visibility of the projected light beam, while a mirror 95 disposed at an angle enables the projection on the ground glass to be observed from various directions.

In the operation of the releasing and locking mechanism RM and the electric circuit control mechanism EC (Figs. 2 and 4), when the depressed actuating bar 65 under control of the advanced coin reaches the midway position (Fig. 4) in its downward stroke, it engages and pushes down the lateral lug 71 of the control member 68, thereby partially raising the control member and slightly raising the contactor tip 74 and permitting the lower leaf spring 75b to engage the upper leaf spring 75a of the switch, thus closing the circuit and lighting the lamp L. Simultaneously under control of the operating pin 93 carried by the actuating bar 65, engaging the shutter bar finger 92, the shutter S is swung downwardly between the projector P and the mirror M (Fig. 4), thereby intercepting and shutting off the light beam until the coin has been farther advanced and completes its final operative function. When the actuating bar 65 has reached its full downward stroke the control member 68 is raised higher, as shown in dotted outline in Fig. 4, freeing the contactor tip 74 from the lower leaf spring 75b and carrying upward its lateral pin 82 to engage and be held by the hooked end 80 of the locking hook 78. Simultaneously the shutter bar 90 is raised by the operating pin 93 of the actuating bar 65, thereby returning to its inoperative position and raising the shutter S, and thus permitting the light beam to be projected, while the control member 68 is held in its elevated position continually during the projection of the light beam and the operation of the heart beat mechanism. Upon the operator stepping down from the platform the control member 68 is released from the locking hook 78 by the pointed tip end 86 of the tripping dog moving upwardly with the rack rod 85 and engaging the roller 87 on the locking hook 78, thereby tripping the hook backward and freeing it from the pin 82 of the control member 68, which under influence of the weighted portion 72 is automatically swung to its operative position (Fig. 4), its contactor tip 74 depressing the lower leaf spring 75b and opening the switch 76, which opens the circuit and shuts off the current to the electric lamp L. The parts are thus left in position to again function when another coin is inserted in the coin control mechanism CM to release the heart beat mechanism for operation.

While we have shown a preferred embodiment of our invention it is evident that changes and modifications in the construction herein shown and described may be made that would come within the scope thereof and it is not intended, therefore, to limit the invention to the precise details of construction shown.

We claim:

1. In a device of the character described, in combination, rotatable indicator mechanism mounted in an assembly unit supported by a base plate, a draft rod adapted to actuate the said indicator mechanism, a source of light emanating a light beam, perforated light beam directing means carried by the said indicator mechanism, a connector frame having the draft rod swivelly connected thereto, tension adjusting means comprising a tiltable plate adjustably mounted below the assembly unit base plate on spaced bolts attached thereto and provided with an enlarged opening therethrough for the passage of one of the said bolts serving thereby as a fulcrum point for the tiltable plate, opposed spring holding blocks depending from the said tiltable plate, resilient means comprising coiled springs adjustably mounted at their upper ends in spaced lugs on the said holding blocks and having their lower ends swivelly mounted in spaced lugs on the said connector frame, means for adjusting the position of the tiltable plate on its fulcrum point for balancing the indicator at the zero position, and means carried by the spring adjusting blocks for adjusting the tension of the said springs, the said resilient means being adapted to oscillate the perforated light beam directing means on reaching its balanced position under influence of the heart pulsations of the operator.

2. In a device of the character described, rotatable indicator mechanism including a translucent light beam indicator, weighing mechanism, a draft rod co-operating with the weighing and indicator mechanisms, a source of light emanating a light beam, perforated light beam directing means carried by the said indicator mechanism, optical projecting means co-operating with the said perforated light beam directing means in projecting a light beam therefrom, reflector means interposed between the light beam directing means and the indicator mechanism, and means for oscillating the light beam directing means comprising resilient means intervened between and operatively connecting the weighing mechanism and the indicator mechanism, whereby the projected light beam is caused to oscillate as it traverses the translucent light beam indicator.

3. In a device of the character described, rotatably mounted indicator mechanism including a translucent light beam indicator, a light beam directing disc carried by the said indicator mechanism and provided with a peripheral portion having a series of spaced perforations, light beam reflectors disposed at oblique angles to the projecting means and to each other and adapted to direct the light beam therefrom to the said translucent light beam indicator, optical projecting means adapted to project a light beam from a source of light through the said perforations to the translucent light beam indicator co-operating therewith, means for oscillating the light beam directing means comprising resilient means interposed between and operatively connecting the weighing mechanism and the indicator mechanism, whereby the projected light beam is caused to oscillate as it passes over the translucent light beam indicator, and a shadow box for the said translucent light beam indicator provided with vertical walls enclosing the sides of the translucent indicator and adapted thereby to prevent external light from reducing the visibility of the projected light beam.

4. In a device of the character described, rotatably mounted indicator mechanism including a translucent light beam indicator, a light beam directing disc carried by the said indicator mechanism and provided with a peripheral portion having a series of spaced perforations, optical projecting means adapted to project a light beam from a source of light through the said perforations to the said translucent light beam indicator co-operating therewith, means for oscillating the light beam directing means comprising resilient means interposed between and operatively connecting the weighing mechanism and indicating mechanism, whereby the projected light beam is caused to oscillate as it passes over the translucent light beam indicator, and means for temporarily intercepting the projected light beam including a shutter disposed on a rod secured to a pivotally mounted member and adapted in operation to be moved in front of the projecting means.

5. In a device of the character described, rotatable indicator mechanism mounted in an assembly unit supported by a base plate, a draft rod adapted to actuate the said indicator mechanism, a source of light emanating a light beam, perforated light beam directing means carried by the said indicator mechanism, a connector frame having the draft rod swivelly connected thereto, tension adjusting means comprising a tiltable plate adjustably mounted and fulcrumed below the assembly unit base plate, resilient means comprising spaced, coiled springs connected to the tiltable plate and the connector frame, and means for adjusting the tension of the said springs, the said resilient means being adapted to oscillate the perforated light beam directing means on reaching its balanced position under influence of the heart pulsations of the operator.

ALVAH B. JACOBUS.
HARLAN A. HADLEY.